United States Patent
Spiegel (10) Patent No.: US 9,882,907 B1
(45) Date of Patent: *Jan. 30, 2018

(54) APPARATUS AND METHOD FOR SINGLE ACTION CONTROL OF SOCIAL NETWORK PROFILE ACCESS

(71) Applicant: Snap Inc., Venice, CA (US)

(72) Inventor: Evan Spiegel, Los Angeles, CA (US)

(73) Assignee: Snap Inc., Venice, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 14/701,494

(22) Filed: Apr. 30, 2015

Related U.S. Application Data (63) Continuation of application No. 14/325,260, filed on Jul. 7, 2014, now Pat. No. 9,026,943, which is a continuation of application No. 13/672,654, filed on Nov. 8, 2012, now Pat. No. 8,775,972.

(51) Int. Cl.
| | |
|---|---|
| *H04L 12/58* | (2006.01) |
| *H04L 29/06* | (2006.01) |
| *H04L 29/08* | (2006.01) |

(52) U.S. Cl.
CPC .............. *H04L 63/10* (2013.01); *H04L 63/08* (2013.01); *H04L 67/306* (2013.01); *G06F 2203/04803* (2013.01); *H04L 51/12* (2013.01)

(58) Field of Classification Search
CPC ........ G06F 21/6245; G06F 3/01; G06F 21/31; G06F 2203/04803; H04L 63/10; H04L 63/0815; H04L 51/12; H04N 1/0087
See application file for complete search history.

(56) References Cited

U.S. PATENT DOCUMENTS

| | | |
|---|---|---|
| 5,999,932 A | 12/1999 | Paul |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,216,141 B1 | 4/2001 | Straub et al. |
| 6,310,694 B1 | 10/2001 | Okimoto et al. |
| 6,484,196 B1 | 11/2002 | Maurille |
| 6,665,531 B1 | 12/2003 | Soderbacka et al. |
| 6,724,403 B1 | 4/2004 | Santoro et al. |
| 6,757,713 B1 | 6/2004 | Ogilvie et al. |
| 6,898,626 B2 | 5/2005 | Ohashi |
| 7,124,164 B1 | 10/2006 | Chemtob |
| 7,149,893 B1 | 12/2006 | Leonard et al. |
| 7,203,380 B2 | 4/2007 | Chiu et al. |
| 7,356,564 B2 | 4/2008 | Hartselle et al. |
| 7,519,670 B2 | 4/2009 | Hagale et al. |

(Continued)

OTHER PUBLICATIONS

IVisit, "iVisit Mobile Getting Started", Dec. 4, 2013, iVisit, pp. 1-16.

(Continued)

*Primary Examiner* — Shen Shiau
(74) *Attorney, Agent, or Firm* — Cooley LLP (57) ABSTRACT

A computer implemented method includes allowing a user to access a user-controlled social network profile page with posts in a specified order. A user is permitted to traverse an interface element across the specified order to establish a set position for the interface element. Access to posts is provided on a first side of the set position to define a viewable profile. Access to posts is blocked on a second side of the set position to define a non-viewable profile.

5 Claims, 8 Drawing Sheets

(56) References Cited

U.S. PATENT DOCUMENTS

| | | |
|---|---|---|
| 8,001,204 B2 | 8/2011 | Burtner et al. |
| 8,112,716 B2 | 2/2012 | Kobayashi |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,471,914 B2 | 6/2013 | Sakiyama et al. |
| 8,560,612 B2 | 10/2013 | Kilmer et al. |
| 8,744,523 B2 | 6/2014 | Fan et al. |
| 8,775,972 B2 * | 7/2014 | Spiegel ............... G06F 21/6245 715/747 |
| 8,788,680 B1 | 7/2014 | Naik |
| 8,797,415 B2 | 8/2014 | Arnold |
| 8,856,349 B2 | 10/2014 | Jain et al. |
| 9,026,943 B1 * | 5/2015 | Spiegel ............... G06F 21/6245 715/747 |
| 9,037,577 B1 * | 5/2015 | Saylor ............... G06F 17/30551 707/725 |
| 2002/0047868 A1 | 4/2002 | Miyazawa |
| 2002/0122659 A1 | 9/2002 | McGrath et al. |
| 2002/0144154 A1 | 10/2002 | Tomkow |
| 2003/0016247 A1 | 1/2003 | Lai et al. |
| 2003/0052925 A1 | 3/2003 | Daimon et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0104503 A1 | 5/2008 | Beall et al. |
| 2008/0207176 A1 | 8/2008 | Brackbill et al. |
| 2008/0222545 A1 | 9/2008 | Lemay et al. |
| 2008/0250332 A1 * | 10/2008 | Farrell .................. G06Q 10/10 715/753 |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102630 A1 | 5/2011 | Rukes |
| 2011/0145564 A1 | 6/2011 | Moshir et al. |
| 2011/0197194 A1 | 8/2011 | D'Angelo et al. |
| 2011/0211534 A1 | 9/2011 | Schmidt et al. |
| 2011/0213845 A1 | 9/2011 | Logan et al. |
| 2011/0271328 A1 * | 11/2011 | Sutton-Shearer ... G06F 21/6245 726/4 |
| 2011/0273575 A1 | 11/2011 | Lee |
| 2011/0283188 A1 | 11/2011 | Farrenkopf et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0184248 A1 | 7/2012 | Speede |
| 2012/0200743 A1 | 8/2012 | Blanchflower et al. |
| 2012/0210244 A1 | 8/2012 | de Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |

(56) References Cited

U.S. PATENT DOCUMENTS

| | | |
|---|---|---|
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1* | 5/2014 | Spiegel ............... G06F 21/6245 715/741 |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317302 A1 | 10/2014 | Naik |
| 2014/0325383 A1 | 10/2014 | Brown et al. |
| 2015/0046278 A1 | 2/2015 | Pei et al. |
| 2015/0082342 A1* | 3/2015 | Norwood ............ G06F 17/3089 725/32 |

OTHER PUBLICATIONS

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self_destruct_in_60_seconds, referred to hereinafter as Read-Write.

Sawers, Paul, "Snapchat for iOS Lets You Send Photos to Friends and Set How long They're Visible for", May 7, 2012, <http://thenextweb.com/apps/2012/05/07/Snapchat-for-ios-lets-you-send-photos-to-friends-and-set-how-long-theyre-visiblefor/#!xCjrp>, pp. 1-5.

International Search Report and Written Opinion issued to International Patent Application No. PCT/US2014/040346, dated Mar. 23, 2015, 9 pgs.

* cited by examiner

APPARATUS AND METHOD FOR SINGLE ACTION CONTROL OF SOCIAL NETWORK PROFILE ACCESS

CROSS REFERENCE TO RELATED APPLICATIONS

This application is a continuation of U.S. patent application Ser. No. 14/325,260 filed Jul. 7, 2014 which is a continuation of U.S. patent application Ser. No. 13/672,654 filed Nov. 8, 2012, now U.S. Pat. No. 8,775,972 issued Jul. 8, 2014, the contents of which are incorporated herein by reference.

FIELD OF THE INVENTION

This invention relates generally to communications in computer networks. More particularly, this invention relates to single action control of social network profile access.

BACKGROUND OF THE INVENTION

A social network service is an online service, platform or site that facilitates the building and maintenance of social relations among individuals. Each member of a social network service maintains a profile with user information and user posts, which may be comments, photographs, videos, endorsements and the like. The posts may be from the user and/or individuals that the user is affiliated with in the social network. In this way, social network sites allow users to share ideas, activities, events and interests with affiliated individuals.

Privacy is a growing concern with social networks. Information posted by a user or an affiliated individual may be distasteful or become outdated. The user may desire to restrict access to certain information on their profile while allowing access to other information. While most social networks have configurable privacy control settings, such privacy control settings may be hard to find and in many instances they are confusing, resulting in an unintended access to information. Given that users are generally able to see all of the content that they have contributed to their profile, it can be difficult to determine what content is visible to others and what is visible only to the user.

Accordingly, improved techniques for controlling social network profile access are desirable.

SUMMARY OF THE INVENTION

A computer implemented method includes allowing a user to access a user-controlled social network profile page with posts in a specified order. A user is permitted to traverse an interface element across the specified order to establish a set position for the interface element. Access to posts is provided on a first side of the set position to define a viewable profile. Access to posts is blocked on a second side of the set position to define a non-viewable profile.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
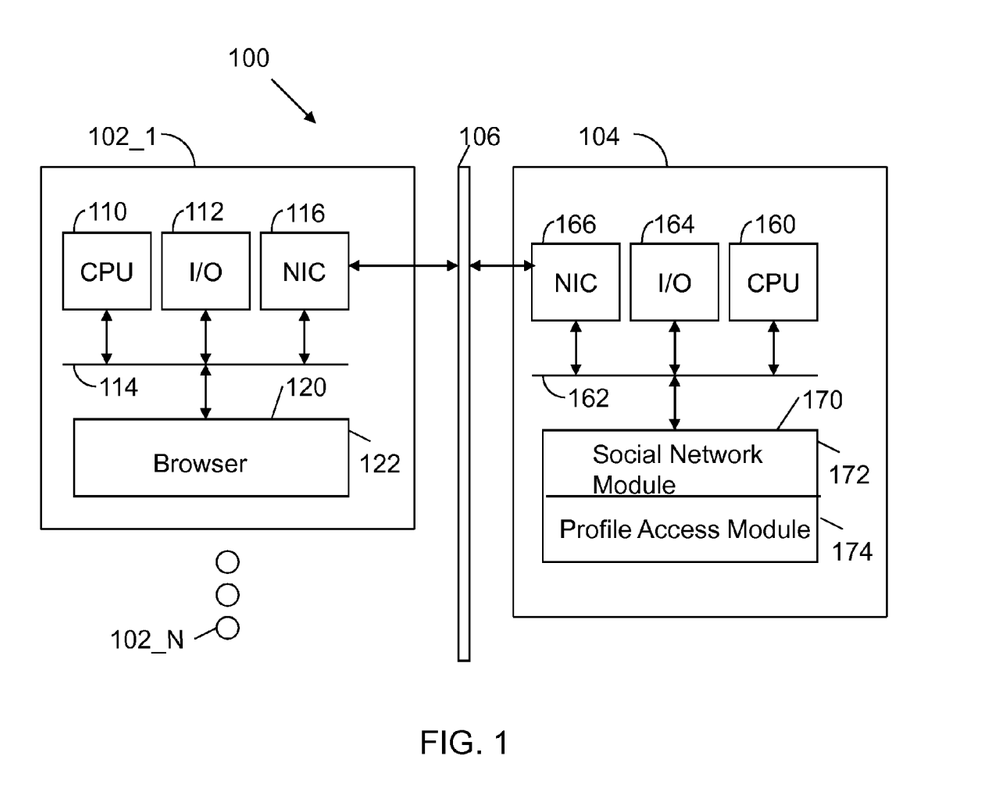
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106, which may be any wired or wireless network.

Each client device 102 may be a computer, tablet, Smartphone and the like with standard components, such as a central processing unit 110 connected to input/output devices 112 via a bus 114. The input/output devices 112 may include a touch display, keyboard, mouse and the like. A network interface circuit 116 is also connected to the bus 114 to provide connectivity with network 106.

A memory 120 is also connected to the bus 114. The memory 120 stores standard components, such as a browser 122, which allow one to access a social network site, such as a social network site hosted on server 104. Server 104 also includes standard components, such as a central processing unit 160 connected to input/output devices 164 via a bus 162. A network interface circuit 166 is also connected to the bus 162. Further, a memory 170 is connected to the bus 162. The memory 170 stores modules of executable instructions to implement disclosed operations. For example, the memory 170 may store a social network module 172, which supports standard social network operations, such as hosting profile pages, maintaining social graphs for individual users and facilitating communication between the individual users.

The memory 170 also stores a profile access module 174. The profile access module 174 includes executable instructions to implement operations of the invention. In particular, the profile access module 174 includes executable instructions to allow a user to manipulate an interface element to establish single action control of social network profile access. The interface element may be any object (e.g., bar, line, circle) that partitions one set of information from another set of information.

Figure 2:
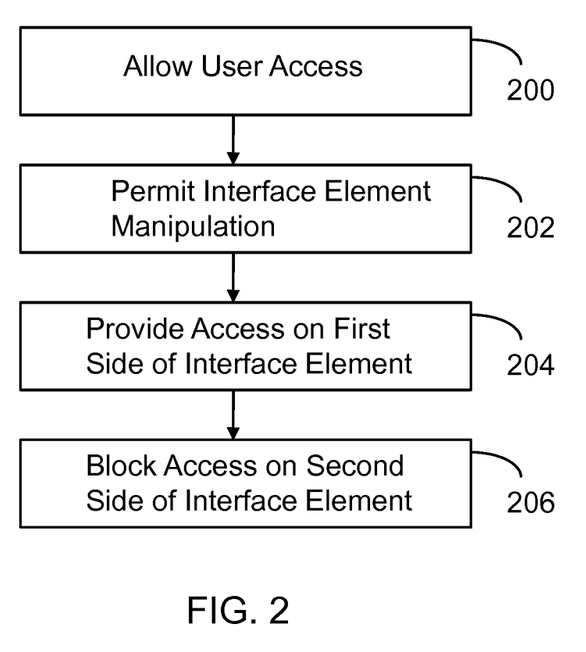
FIG. 2 illustrates processing operations associated with an embodiment of the invention.

FIG. 2 illustrates processing operations associated with an embodiment of the profile access module 174. Initially, a user is allowed access to a user-controlled social network profile page 200. For example, a client device 102 may access the social network module 172 of the server 104. In response, the server 104 supplies to the client a user-controlled social network profile page.

Figure 3:
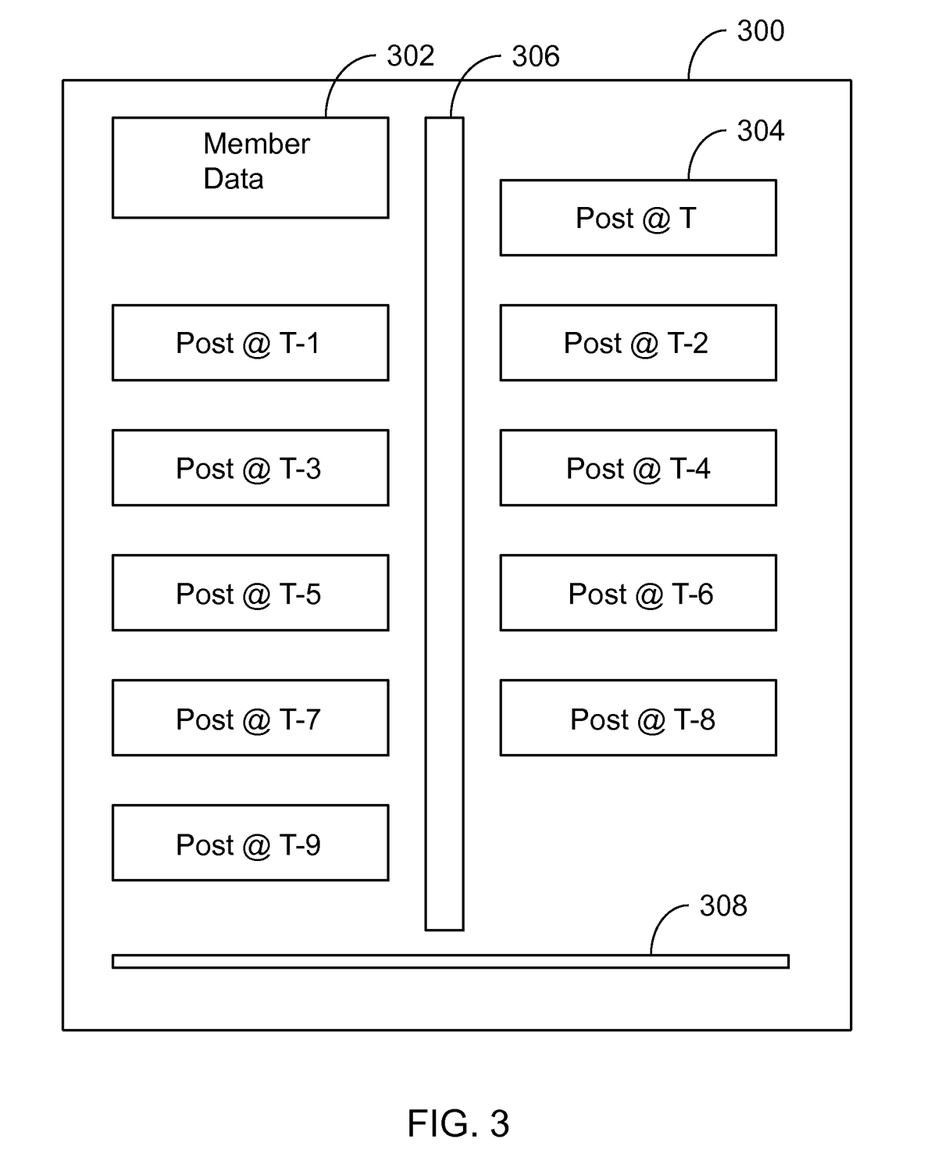
FIG. 3 illustrates a profile page with a single action interface element utilized in accordance with an embodiment of the invention.

FIG. 3 illustrates a user-controlled social network profile page 300, which may be displayed on a client device. The profile page 300 includes member data 302. The member data 302 may specify the member's name, biographic information, interests and the like. In one embodiment of the invention, the member data 302 is in a fixed position such that it is always viewable.

The profile page 300 also includes posts 304 in a specified order, in this case along a temporal axis 306. In this example, there are 10 posts. The latest post is "Post@T", while earlier posts are marked "Post@T-1" through "Post@T-9". FIG. 3 also illustrates an interface element 308. In this case, the interface element is referred to as a privacy bar.

Figure 4:
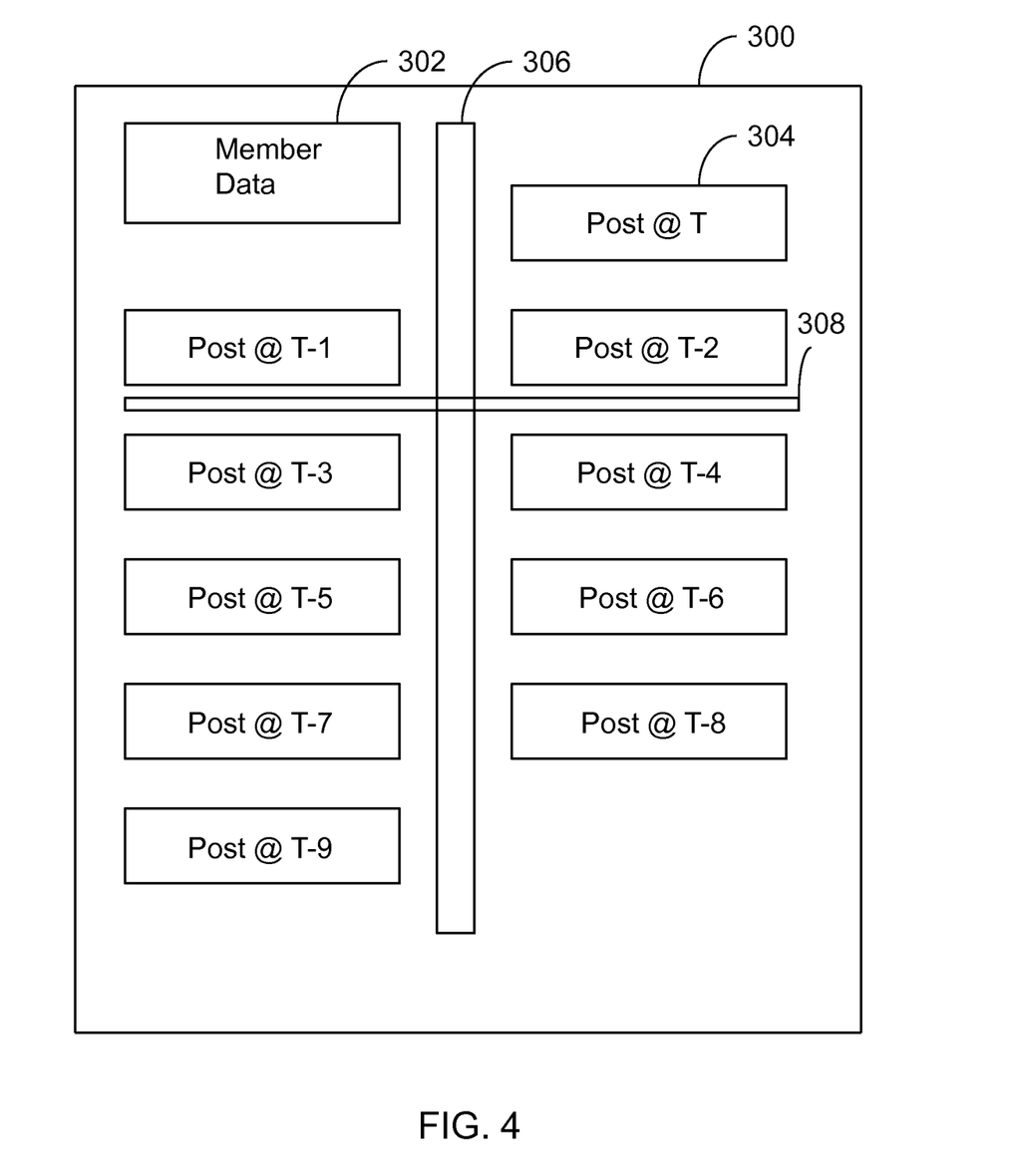
FIG. 4 illustrates a profile page with a re-positioned interface element.

Returning to FIG. 2, the next operation performed by the profile access module 174 is to permit the interface element to be manipulated 202. For example, the interface element 308 may be dragged with a single action gesture applied to a touch display of the client device. Alternately, the interface element 308 may be manipulated through a single action mouse stroke or keyboard stroke. The interface element 308 is manipulated along the temporal axis 306. As the interface element 308 is manipulated, the server 104 refreshes the profile page 300 displayed on the client device. FIG. 4 illustrates an example of a refreshed profile page with the interface element 308 at a new position. Observe that the user of the user-controlled social network profile page can still view posts on either side of the interface element 308. However, members of the user's social network have limited post access. That is, as shown in FIG. 2, social profile access is provided on a first side of the interface element 204. In this example, social profile access is provided on top of the interface element 308. Access is blocked on the second side of the interface element 206. In this example, social profile access is blocked on the bottom of the interface element.

Figure 5:
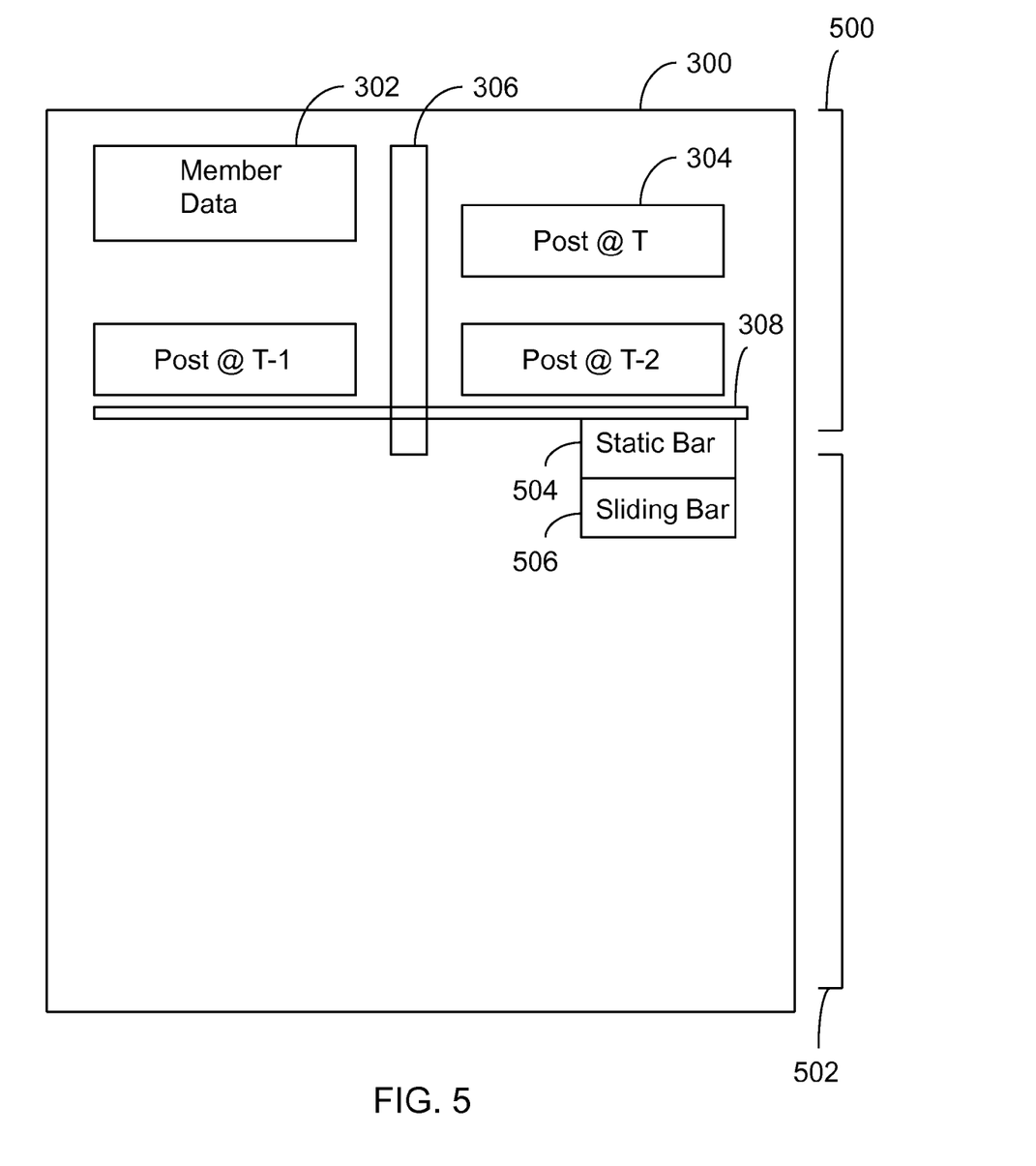
FIG. 5 illustrates a profile page with that provides selective profile information in accordance with an embodiment of the invention.

FIG. 5 illustrates this functionality. In particular, FIG. 5 illustrates the provision of access to posts on the first side of the bar position to define a viewable profile 500. FIG. 5 also illustrates the blocking of access to posts on a second side of the bar position to define a non-viewable profile 502.

The interface element 308 may include a configurable setting to establish the future position of the interface element 308. As shown in FIG. 5, a user may select a static interface element 504 or a sliding interface element 506. The system may have a default to one option or the other. In the case of a static bar, as time advances the viewable profile expands. That is, the currently viewable posts "Post@T", Post@T-1" and "Post@T-2" would remain viewable and additional posts would be positioned on top of them in temporal order. In the case of a sliding bar, as time advances, the viewable profile maintains a static temporal window size. In this example, the viewable profile would include a temporal window size for three posts. Thus, as new posts arrive, an older post, such as "Post@T-2" would slide into the non-viewable profile region 502 to make room for the new posts. In this way, a listing of all posts is maintained, but access to the posts is limited. Accordingly, a user can make those posts available at a later time, if desired, by moving the interface element 508 down the temporal axis 306.

Figure 6:
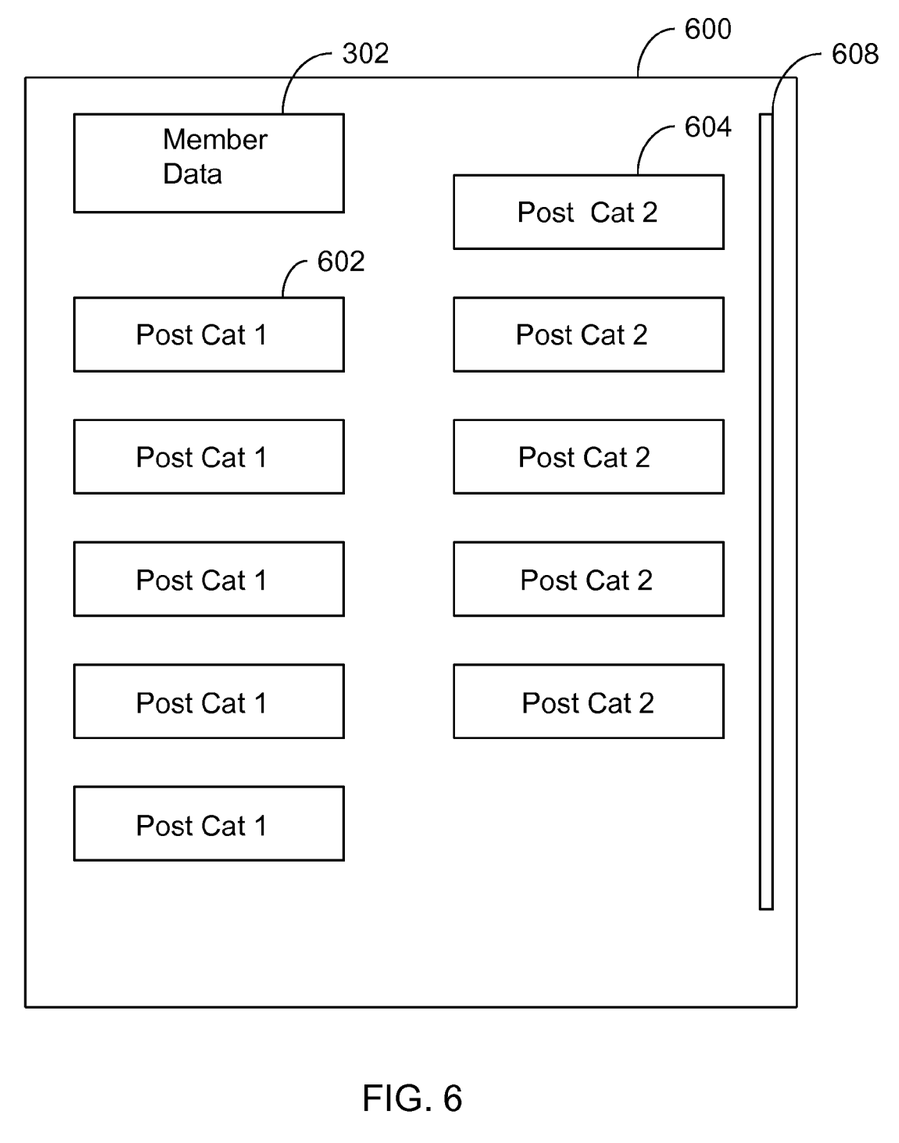
FIG. 6 illustrates a profile page ordered by category.
Figure 7:
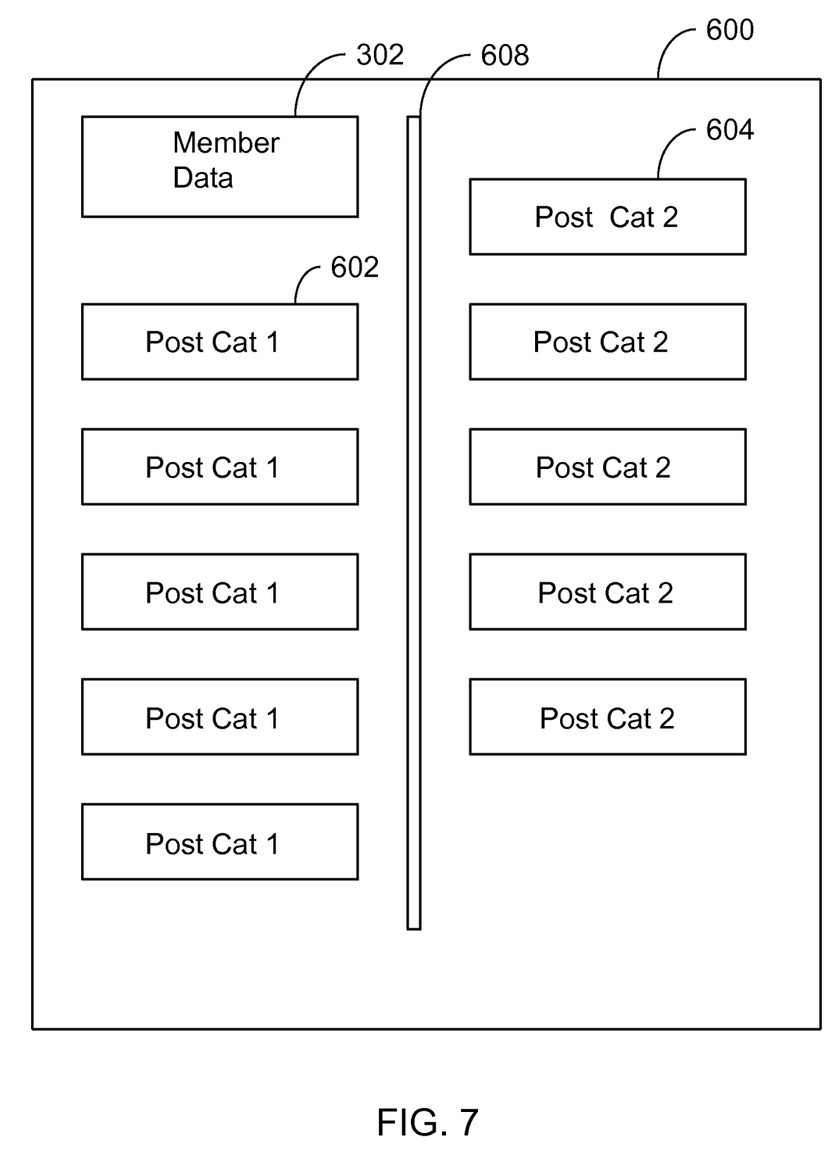
FIG. 7 illustrates the profile page of FIG. 6 with a re-positioned interface element.
Figure 8:
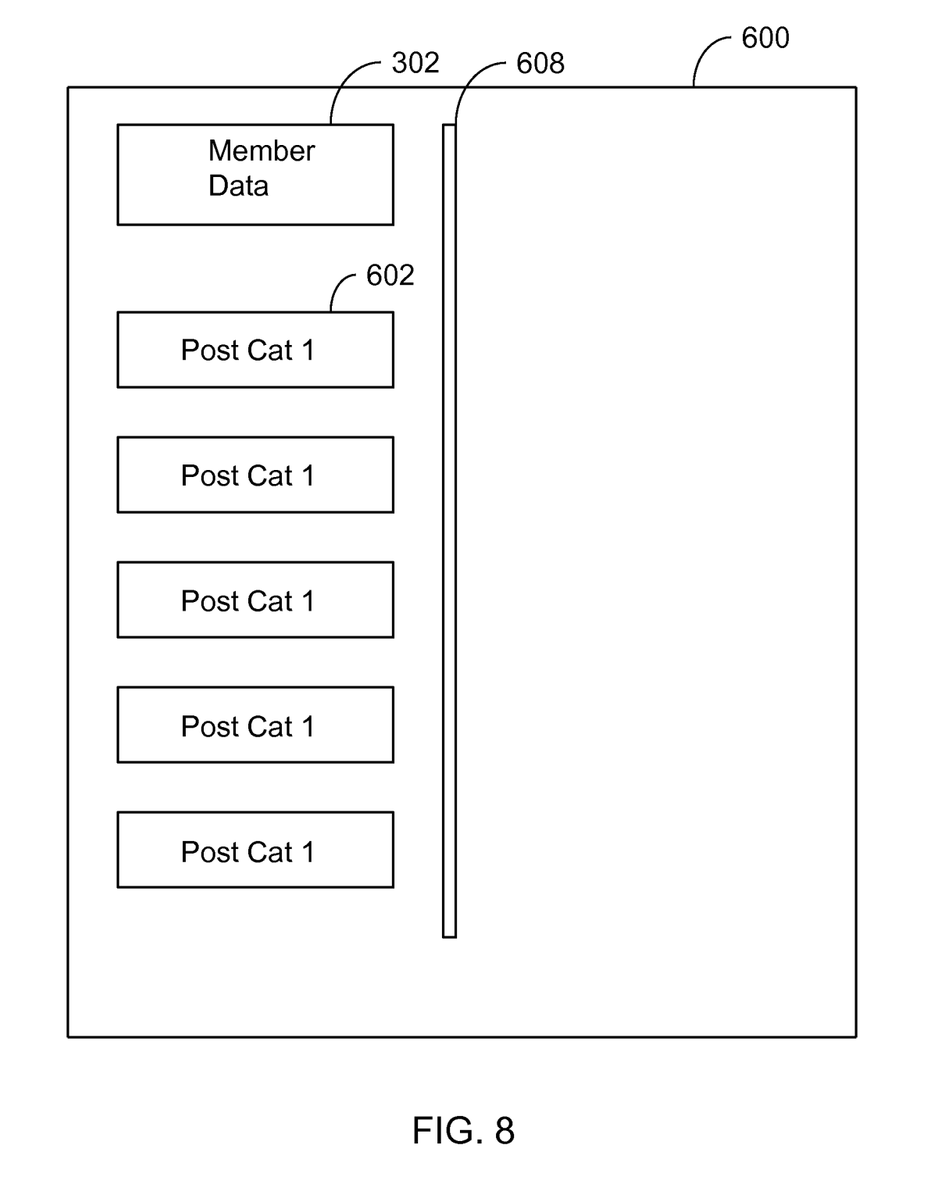
FIG. 8 illustrates the profile page of FIG. 5 with a set privacy control bar that provides selective profile information in accordance with an embodiment of the invention.

The processing operations of FIG. 2 may be applied to profile pages with different configurations. For example, FIG. 6 illustrates a profile page 600 with member data 302 and posts organized by category. In particular, there is a column of posts 602 in a first category and a column of posts 604 in a second category. The category may be established by content, sub-sets of social network members or other criteria. A vertical interface element 608 may be manipulated across category regions. FIG. 7 illustrates a re-positioned interface element 608. Again, the user observes posts on either side of the interface element 608. However, as shown in FIG. 8, members of the user's social network only see posts in the first category 602, while posts in the second category are blocked.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
    allowing a user to access a user-controlled social network profile page with posts organized by category;
    permitting a user to traverse an interface element across the posts to establish a set position for the interface element;
    providing access to posts on a first side of the set position for the interface element to define a viewable profile; and
    blocking access to posts on a second side of the set position for the interface element to define a non-viewable profile, wherein blocking access to posts includes blocking access to posts observed by at least some social network members associated with the user, while the user has access to posts on the first side of the set position and the second side of the set position.

2. The computer implemented method of claim 1 wherein the category is a content category.

3. The computer implemented method of claim 1 wherein the category is a sub-set of social network members.

4. The computer implemented method of claim 1 wherein the viewable profile includes fixed information that remains in the viewable profile.

5. The computer implemented method of claim 1 wherein the posts are organized by category and time.

\* \* \* \* \*